United States Patent
Malnati et al.

(10) Patent No.: US 7,421,492 B1
(45) Date of Patent: Sep. 2, 2008

(54) CONTROL ARRANGEMENT FOR OPERATING MULTIPLE COMPUTER SYSTEMS

(75) Inventors: James R. Malnati, Stillwater, MN (US); Tyson R. Midboe, Minneapolis, MN (US); John E. Trierweiler, Maplewood, MN (US); Donald J. Ethen, New Brighton, MN (US)

(73) Assignee: Unisys Corporation, Blue Bell, PA (US)

( * ) Notice: Subject to any disclaimer, the term of this patent is extended or adjusted under 35 U.S.C. 154(b) by 895 days.

(21) Appl. No.: 10/350,982

(22) Filed: Jan. 24, 2003

(51) Int. Cl.
*G06F 15/173* (2006.01)

(52) U.S. Cl. .................. 709/224; 709/223; 709/224

(58) Field of Classification Search ............ 709/223, 709/224
See application file for complete search history.

(56) References Cited

U.S. PATENT DOCUMENTS

| | | | | |
|---|---|---|---|---|
| 5,592,664 | A * | 1/1997 | Starkey ..................... | 707/1 |
| 6,170,067 | B1 * | 1/2001 | Liu et al. .................. | 714/48 |
| 6,182,111 | B1 * | 1/2001 | Inohara et al. ............. | 709/201 |
| 6,271,845 | B1 * | 8/2001 | Richardson ................ | 715/764 |
| 6,785,713 | B1 * | 8/2004 | Freeman et al. ........... | 709/208 |
| 6,826,692 | B1 * | 11/2004 | White ........................ | 726/8 |
| 6,829,639 | B1 * | 12/2004 | Lawson et al. ............. | 709/224 |
| 6,910,078 | B1 * | 6/2005 | Raman et al. .............. | 709/231 |
| 6,965,917 | B1 * | 11/2005 | Aloni et al. ................ | 709/206 |
| 6,993,576 | B1 * | 1/2006 | Labedz et al. ............. | 709/223 |
| 2003/0126307 | A1 * | 7/2003 | Lindner et al. ............ | 709/318 |
| 2004/0250133 | A1 * | 12/2004 | Lim .......................... | 713/201 |

* cited by examiner

*Primary Examiner*—Nathan J. Flynn
*Assistant Examiner*—Mohamed Wasel
(74) *Attorney, Agent, or Firm*—Charles A. Johnson; Robert Marley; Crawford Maunu PLLC

(57) ABSTRACT

A method and apparatus for operating one or more computer systems via an operations-computing arrangement. The operations-computing arrangement includes a plurality of workstations coupled to a plurality of operations servers, and each operations server is coupled to at least one computer system. Each workstation executes software that provides a user interface for operating a computer system, and each operations server provides an interface to a computer system. A first operations server registers with a second operations server for the second operations server to forward event reports received by the second operations server to the first operations server. The second operations server generates event reports in response to computer system events. Event reports are transmitted from the second operations server to one or more workstations coupled to the second operations server, and also to the first operations server. A user interface on each workstation provides for display of data related to the event reports and for input of controls for operation of the computer systems.

20 Claims, 3 Drawing Sheets

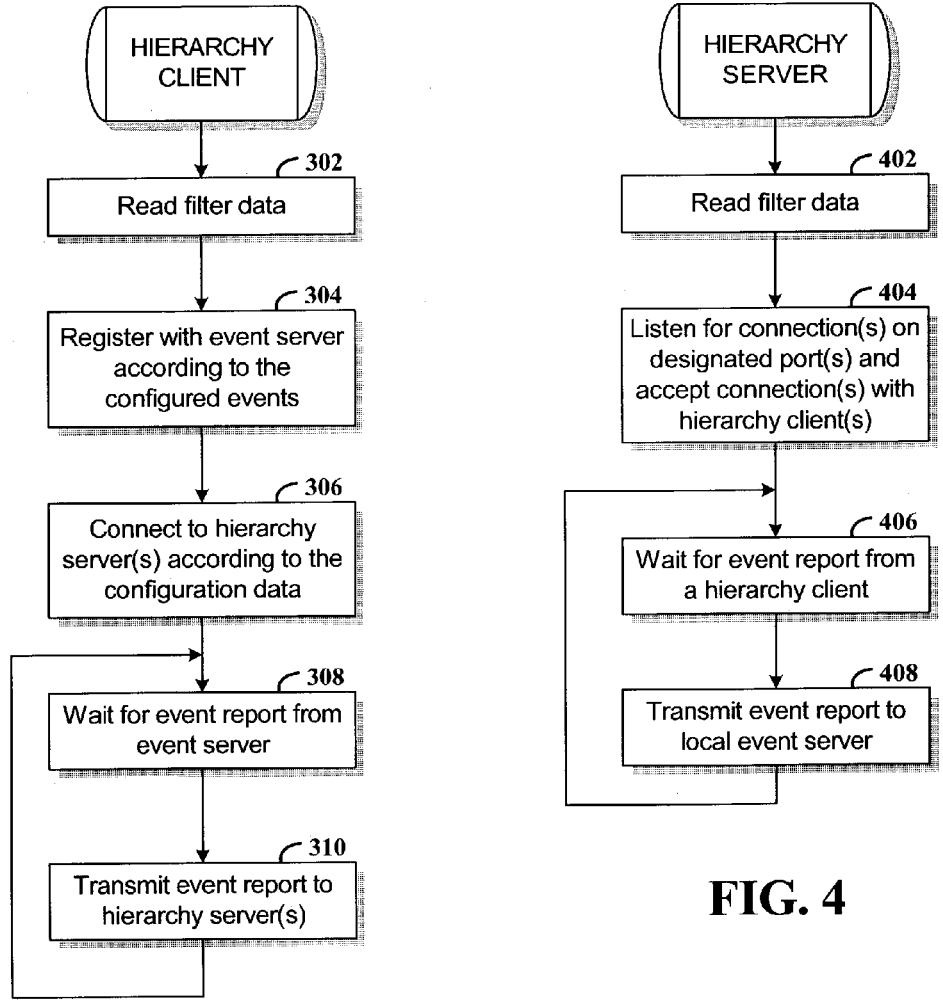

CONTROL ARRANGEMENT FOR OPERATING MULTIPLE COMPUTER SYSTEMS

FIELD OF THE INVENTION

The present invention relates to operating computer systems, and more particularly to a control arrangement for operating computer systems.

BACKGROUND OF THE INVENTION

Large-scale computer systems often host multiple applications that support many users. Example applications include database applications, file servers, and software services. Some large-scale computer systems are controlled and managed by operators. The users are those who rely on the services provided by a system, and operators are those who are those responsible for keeping the systems operational, providing first level support for application, database, and network exceptions or requests, and escalating any issues to the appropriate support personnel.

Many products have been developed to assist operators in performing their designated tasks. For example, the Single Point Operations (SPO) product from Unisys is a LAN-based arrangement, including applications running on workstations connected to the LAN, that supports various operations scenarios. For example, the SPO arrangement supports operations of multiple systems by a single operator at one workstation, operations of a single system by multiple operators, and various alarm and automation functions.

The SPO product includes applications, for example alarm and status applications, that are driven by event reports, which are generated by various automation components of the SPO product. The event reports are forwarded to the applications by another SPO component called the SPO server. Large data centers use multiple SPO servers to distribute the load of processing event reports and as a means of providing a failover SPO server should another SPO server fail.

The manner in which event reports are processed by a SPO server impacts operational flexibility. A SPO server transmits event reports only to SPO applications on connected workstations. This limits the ability to configure certain fail-over capabilities in a SPO environment. In a SPO environment a "secondary" SPO server can take over for a primary SPO if the primary SPO server fails. In the event that the primary SPO server fails, the secondary SPO server connects to the computer system formerly controlled by the primary SPO server. Because a SPO server only sends event reports to SPO applications, the secondary SPO server will not have available the history of event reports prior to failure of the primary SPO server. In other words, the context of the controlled system, for example, status and alarm information, is lost when the new SPO server takes over.

A method and system that addresses these and other related problems are therefore desirable.

SUMMARY OF THE INVENTION

The invention provides for operations of one or more computer systems via an operations-computing arrangement. The operations-computing arrangement includes a plurality of workstations coupled to a plurality of operations servers, and each operations server is coupled to at least one computer system. Each workstation executes software that provides a user interface for operating a computer system, and each operations server provides an interface to a computer system.

A first operations server registers with a second operations server for the second operations server to forward event reports received by the second operations server to the first operations server. The second operations server generates event reports in response to computer system events. Event reports are transmitted from the second operations server to one or more workstations coupled to the second operations server, and also to the first operations server. A user interface on each workstation provides for display of data related to the event reports and for input of controls for operation of the computer systems.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which:

FIG. 3 is a flowchart of a process performed by a hierarchy client component in accordance with one embodiment of the invention; and FIG. 4 is a flowchart of a process performed by a hierarchy server component in accordance with one embodiment of the invention.

DETAILED DESCRIPTION

Figure 1:
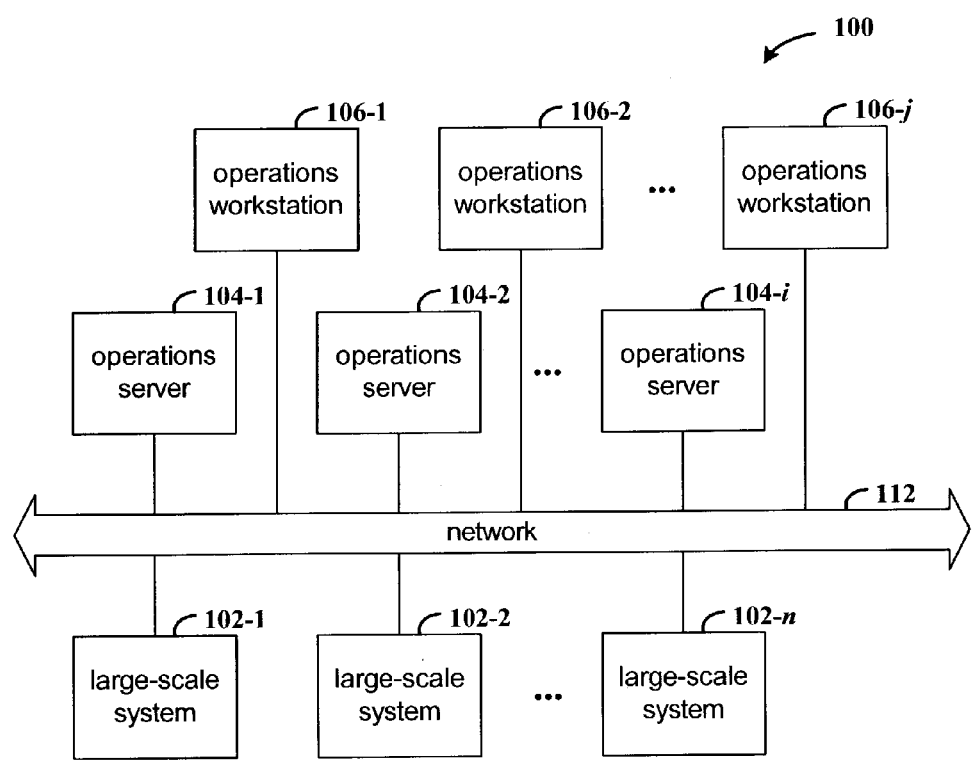
FIG. 1 is a functional block diagram of a computing arrangement in which multiple large-scale systems are operated via a workstation and server arrangement.

FIG. 1 is a functional block diagram of a computing arrangement 100 in which multiple large-scale systems 102-1-102-n are operated via a workstation and server arrangement. The example workstation and server arrangement includes multiple operations servers 104-1-104-i and multiple operations workstations 106-1-106-j. Example types of large-scale systems include ES7000, ClearPath, and ClearPath Plus systems from Unisys. Operators of systems 102-1-102-n use an arrangement of workstations and servers to operate, control, and manage the systems. The Single Point Operations (SPO) product, also from Unisys, is an example software system that is deployable in various combinations of operations servers and operations workstations. The combination of operations software, and the operations servers and workstations is referred to as an "operations environment."

The operational interfaces of the large-scale systems are coupled to the operations servers via a network 112. The operations workstations are also coupled to the operations servers via the network. The characteristics of network 112 (e.g., LAN vs. WAN, dedicated vs. shared, etc.) depend on the implementation requirements of the computing arrangement.

A first software component (not shown) executes on an operations server and interacts with the operational interface (not shown) of one or more large-scale systems. A second component (not shown), executing an operations workstation, provides the user interface for an operator and is interfaced with the component on the operations server. An example configuration of servers and workstations in a SPO environment includes a PC running Microsoft Windows 2000 and the SPO workstation client applications and, for example, an Aquanta Enterprise Server running Windows 2000 Server and the SPO server daemons.

An embodiment of the present invention supports establishing a logical hierarchy of operations servers. In establishing the logical hierarchy, the operations servers are configured to register to receive events from one or more other operations servers. For example, operations server 104-1 may be configured to register with operations servers 104-2 and 104-3 (not shown), 104-4 (not shown), . . . 104-g (g<i, and not shown) to receive events. In addition, the operations servers may register with one another to form a logical hierarchy with 2 or more levels. In forwarding an event report, each operations server checks the originating operations server of the event report so that event reports are not returned to the originating operations server.

Figure 2:
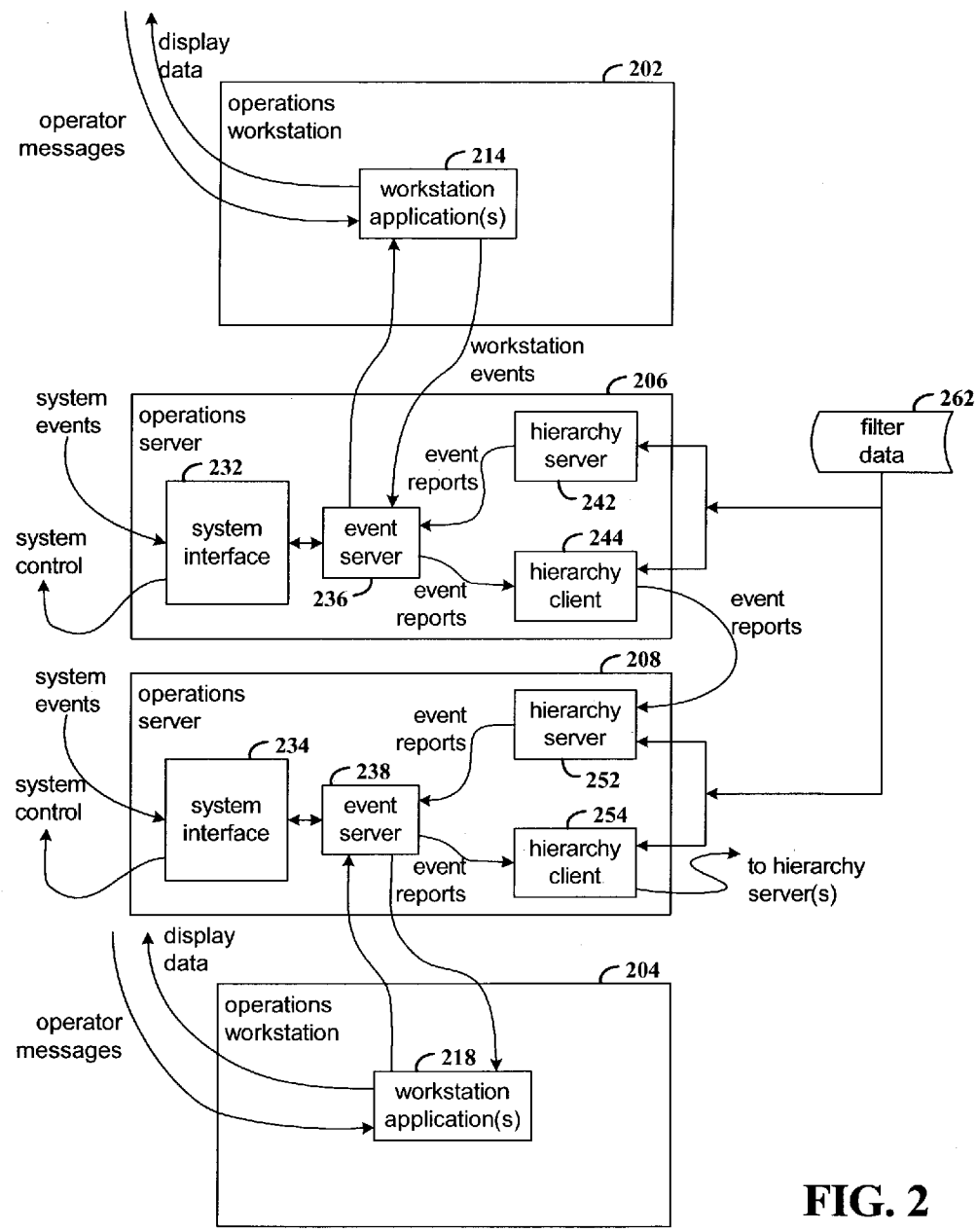
FIG. 2 is a data flow diagram that illustrates the flow of event reports between operations servers that are hierarchically coupled.

FIG. 2 is a block diagram that illustrates the flow of event reports between operations servers. The example operations workstations and operations servers have reference numerals 202, 204, 206, and 208, respectively. Each of the operations workstations hosts one or more workstation applications. Operations workstation 202 includes workstation application 214, and operations workstation 204 includes workstation application 218.

Each operations workstation hosts one or more workstation applications. A workstation application provides functions for controlling a system, automating operation of a system, and obtaining and reporting status information from the system. Data that are input by the operator are used, for example, to control the system from the workstation or to obtain status information related to the system. Data that are output to an operator indicate some status of the system. Control data input by an operator are processed by the workstation application before being presented to an operations server, which passes system control data to the system. Similarly, data received from a system by an operations server are forwarded to a workstation application, which uses the user interface to output data if required.

Each operations server hosts a component that interfaces with a controlled system and that processes data received from the system. This component is represented as system interface block 232 in operations server 206 and block 234 in operations server 208. Event reports are generated by the systems interface in response to the data received from the controlled system and forwarded to an event server. Each operations server hosts an event server that is coupled to the system interface. For example, event server 236 is coupled to systems interface 232, and event server 238 is coupled to systems interface 234. The event server receives event reports from the system interface and transmits the event reports to clients ("event-server client") that have registered to receive such reports. The workstation applications 214 and 218 are example event-server clients. When an event-server client is started, it connects to the event server, for example, via a socket connection, and indicates to the event server the types of events for which event reports are to be forwarded to the client. The event server also receives event reports from the event-server clients.

Each event server can service multiple operations workstations, thereby providing multiple control points. Similarly, multiple workstation applications on a single operations workstation can be configured to control and monitor multiple systems via multiple event servers.

In support of establishing a hierarchy of operations servers, each of the operations servers 206 and 208 is configured with a hierarchy server and a hierarchy client. Operations server 206 hosts hierarchy server 242 and hierarchy client 244, and operations server 208 hosts hierarchy server 252 and hierarchy client 254. When hierarchy client 244 begins executing on operations server 206, the hierarchy client connects to local event server 236 and registers callback routines for the events defined in the filter data 262. Hierarchy client 244 then connects remotely to hierarchy server 252 that is executing on operations server 208, as specified in the filter file 262. Hierarchy server 252 is connected to its local event server 238. When an event for which hierarchy client 244 has registered is received by event server 236, the callback routines of the hierarchy client are executed. The callback routines format the data and send the data via the network to hierarchy server 252 on operations server 208. Hierarchy server 252 then reformats the data before sending the data to event server 238.

The filter data 262 that are input to the hierarchy servers and hierarchy clients are used to control the types of events that are monitored and to indicate the hierarchy server to which a hierarchy client is to connect. In one embodiment, the filter data indicate to the hierarchy client which port on which operations server to which to connect. The filter data also indicate to the hierarchy server on which port to listen for incoming connections. It will be appreciated that the filter data may be constituted as a single set of data, in multiple data sets, or configured within the hierarchy server and hierarchy client programs.

In the example embodiment, there are several types of event reports that are used by the workstation applications, event server, and system interface in controlling a system. An alarm event report is used by a workstation application to inform an operator of system condition that requires immediate attention. For example, an alarm event report is generated when a certain I/O throughput threshold is reached. An attribute-change event report is used to indicate a change in the value of an monitored attribute of the system, for example, the operational status of a storage device.

In an example flow of an event report, operations server 206 generates an event report related to a monitored system. The event report is sent to event server 236, which in turn forwards it to hierarchy client 244. Hierarchy client 244 then sends the event report to hierarchy server 252, and to any other remote hierarchy servers that have requested notification. Hierarchy server 252 then sends the event report to event server 238, which in turn forwards the event report to the appropriate workstation application 218 for operator notification.

FIG. 3 is a flowchart of a process performed by a hierarchy client component in accordance with one embodiment of the invention. The hierarchy client reads the filter data (step 302). The filter data indicate the operations server(s) to which the hierarchy client is to send event reports and the types of event reports for which the hierarchy client is to register to receive from the local event server.

The hierarchy client registers with the local event server according to the filter data (step 304). The registration indicates to the event server the type of event reports that are to be forwarded to the hierarchy client. The hierarchy client also connects to the hierarchy server(s) specified in the filter data. In one embodiment, the filter data indicate to the hierarchy client the port on the operations server to which the client is to connect.

The hierarchy client then waits to receive event reports from the local event server (step 308). When the hierarchy client receives an event report, it is transmitted to the hierarchy server(s) to which the client is connected (step 310). The process then continues by waiting to receive another event report.

FIG. 4 is a flowchart of a process performed by a hierarchy server component in accordance with one embodiment of the invention. The hierarchy server reads filter (step 402) for determining on which port(s) it should listen for a connection request(s) from a hierarchy client(s) (step 404). When a connection is established with a hierarchy client, the hierarchy server waits for an event report from a hierarchy client (step 406). Event reports received by the hierarchy server are forwarded to the local event server (step 408), which in turn forwards the event reports to the appropriate event-server client(s), for example, a workstation application.

In addition to the embodiments of the invention described above, other aspects and embodiments will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for operating one or more computer systems via an operations-computing arrangement, comprising:
    coupling a first workstation to a first operations server and a second workstation to a second operations server, wherein the first operations server is coupled to the second operations server and to a first computer system and the second operations server is coupled to a second computer system, and each operations server provides an interface to the coupled computer system;
    executing on each of a the first and second workstations, a respective user interface for operating a respective one of the first and second computer systems via the respective interfaces on the first and second operations servers;
    registering the first operations server with the second operations server for the second operations server to forward event reports from the second operations server to the first operations server;
    generating an event report in response to computer system events of the second computer system detected by the second operations server;
    transmitting the event report from the second operations server to the second workstation coupled to the second operations server;
    transmitting the event report from the second operations server to the first operations server;
    transmitting the event report from the first operations server to the user interface on the first workstation; and
    wherein the user interface on each workstation displays data related to the event report and receives input of controls for operation of the respective computer system.

2. The method of claim 1, further comprising:
generating different types of event reports for different types of computer system events; and
selectively transmitting event reports from the second operations server to the first operations server depending on the type of event report.

3. The method of claim 1, further comprising:
generating event reports that include identification of the computer systems as sources of the computer system events; and
selectively transmitting event reports from the second operations server to the first operations server depending on the computer systems identified in the event reports.

4. The method of claim 1, further comprising:
generating event reports that include identification of types of the computer systems as sources of the computer system events; and
selectively transmitting event reports from the second operations server to the first operations server depending on the types computer systems identified in the event reports.

5. The method of claim 1, further comprising:
generating event reports that include identification of hardware units of the computer systems as sources of the computer system events; and
selectively transmitting event reports from the second operations server to the first operations server depending on the hardware unit identified in the event reports.

6. The method of claim 1, further comprising:
generating event reports that include identification of types of hardware units of the computer systems as sources of the computer system events; and
selectively transmitting event reports from the second operations server to the first operations server depending on the types of hardware units identified in the event reports.

7. The method of claim 1, further comprising:
coupling a plurality of operations servers, in addition to the first and second operations servers, to one or more computer systems in addition to the first and second computer systems, and coupling a plurality of workstations, in addition to the first and second workstations, to the plurality of operations servers; and
establishing a registration hierarchy of parent and child operations servers, wherein each parent operation server is registered with one or more child operations servers, and the child operations servers forward event reports to the parent operations server.

8. The method of claim 7, further comprising:
generating different types of event reports for different types of computer system events; and
selectively transmitting event reports from the second operations server to the first operations server depending on the type of event report.

9. The method of claim 8, further comprising:
generating event reports that include identification of the computer systems as sources of the computer system events; and
selectively transmitting event reports from the second operations server to the first operations server depending on the computer systems identified in the event reports.

10. The method of claim 9, further comprising:
generating event reports that include identification of types of the computer systems as sources of the computer system events; and
selectively transmitting event reports from the second operations server to the first operations server depending on the types computer systems identified in the event reports.

11. The method of claim 10, further comprising:
generating event reports that include identification of hardware units of the computer systems as sources of the computer system events; and
selectively transmitting event reports from the second operations server to the first operations server depending on the hardware unit identified in the event reports.

12. The method of claim 11, further comprising:
generating event reports that include identification of types of hardware units of the computer systems as sources of the computer system events; and
selectively transmitting event reports from the second operations server to the first operations server depending on the types of hardware units identified in the event reports.

13. An apparatus for operating one or more computer systems via an operations-computing arrangement, comprising:
coupling a first workstation to a first operations server and a second workstation to a second operations server, wherein the first operations server is coupled to the second operations server and to a first computer system and the second operations server is coupled to a second computer system, and each operations server provides an interface to the coupled computer system;
means for executing on each of a the first and second workstations, a respective user interface for operating a respective one of the first and second computer systems via the respective interfaces on the first and second operations servers;
means for registering the first operations server with the second operations server for the second operations server to forward event reports from the second operations server to the first operations server;
means for generating an event report in response to computer system events of the second computer system detected by the second operations server;
means for transmitting the event report from the second operations server to the second workstation coupled to the second operations server;
means for transmitting the event report from the second operations server to the first operations server;
wherein the user interface on each workstation displays data related to the event report and receives input of controls for operation of the respective computer system.

14. An operations-computing arrangement for operating one or more computer systems, comprising:
a plurality of operations servers, each coupled one to another and each coupled to at least one of the computer systems and configured to provide an interface to the computer system, wherein a first operations server is configured to register with a second operations server for the second operations server to forward event reports received by the second operations server to the first operations server, and the second operations server is configured to generate event reports in response to computer system events detected by the second operations server and transmit the event reports from the second operations server to the first operations server;
a plurality of workstations coupled to the plurality of operations servers, each workstation configured to provide a user interface for display of data related to the event reports and for input of controls for operation of the computer systems, wherein each of the operations servers is configured to transmit event reports to one or more workstations;
wherein a first workstation of the plurality of workstations is coupled to the first operations server and a second workstation of the plurality of workstations is coupled to the second operations server, and the first operations server is coupled to a first computer system and the second operations server is coupled to a second computer system; and
wherein the second operations server is further configured to transmit the event reports to the second workstation coupled to the second operations server, and the first operations server is configured to transmit the event reports received from the second operations server to the user interface on the first workstation.

15. The arrangement of claim 14, wherein the operations servers are configured to generate different types of event reports for different types of computer system events, and the second operations server is configured to selectively transmit event reports to the first operations server depending on the type of event report.

16. The arrangement of claim 14, wherein the operations servers are configured to generate event reports that include identification of the computer systems as sources of the computer system events, and the second operations server is configured to selectively transmit event reports to the first operations server depending on the computer systems identified in the event reports.

17. The arrangement of claim 14, wherein the operations servers are configured to generate event reports that include identification of types of the computer systems as sources of the computer system events, and the second operations server is configured to selectively transmit event reports to the first operations server depending on the types computer systems identified in the event reports.

18. The arrangement of claim 14, wherein the operations servers are configured to generate event reports that include identification of hardware units of the computer systems as sources of the computer system events, and the second operations server is configured to selectively transmit event reports to the first operations server depending on the hardware unit identified in the event reports.

19. The arrangement of claim 14, wherein the operations servers are configured to generate event reports that include identification of types of hardware units of the computer systems as sources of the computer system events, and the second operations server is configured to selectively transmit event reports to the first operations server depending on the types of hardware units identified in the event reports.

20. The arrangement of claim 14, wherein the operations servers are configured to establish a registration hierarchy of parent and child operations servers, wherein each parent operation server is registered with one or more child operations servers, and the child operations servers forward event reports to the parent operations server.

* * * * *